United States Patent
Veres et al.

(10) Patent No.: US 10,414,904 B2
(45) Date of Patent: Sep. 17, 2019

(54) LOW-DUST FILLER FOR COMPOSITE BUILDING PRODUCT

(71) Applicant: THE EUCLID CHEMICAL COMPANY, Cleveland, OH (US)

(72) Inventors: Benjamin Veres, Willowick, OH (US); Fred Tuchscherer, McHenry, IL (US); Bradley Nemunaitis, Chardon, OH (US); Jeffrey Ohler, Mentor, OH (US)

(73) Assignee: THE EUCLID CHEMICAL COMPANY, Cleveland, OH (US)

( * ) Notice: Subject to any disclaimer, the term of this patent is extended or adjusted under 35 U.S.C. 154(b) by 118 days.

(21) Appl. No.: 15/349,461

(22) Filed: Nov. 11, 2016

(65) Prior Publication Data

US 2017/0137612 A1     May 18, 2017

Related U.S. Application Data

(60) Provisional application No. 62/254,268, filed on Nov. 12, 2015.

(51) Int. Cl.
| | |
|---|---|
| *C08K 9/04* | (2006.01) |
| *C08K 9/10* | (2006.01) |
| *C09D 7/80* | (2018.01) |
| *C09D 163/00* | (2006.01) |
| *C04B 26/14* | (2006.01) |
| *C04B 26/16* | (2006.01) |
| *C04B 26/18* | (2006.01) |
| *C04B 26/32* | (2006.01) |
| *C04B 20/10* | (2006.01) |
| *C08K 9/08* | (2006.01) |
| *C08G 59/22* | (2006.01) |
| *C04B 103/00* | (2006.01) |

(52) U.S. Cl.
CPC .......... *C08K 9/04* (2013.01); *C04B 20/1037* (2013.01); *C04B 20/1051* (2013.01); *C04B 26/14* (2013.01); *C04B 26/16* (2013.01); *C04B 26/18* (2013.01); *C04B 26/32* (2013.01); *C09D 7/80* (2018.01); *C09D 163/00* (2013.01); *C04B 2103/0075* (2013.01); *C08G 59/226* (2013.01); *C08K 9/08* (2013.01); *Y02W 30/92* (2015.05)

(58) Field of Classification Search
None
See application file for complete search history.

(56) References Cited

U.S. PATENT DOCUMENTS

| | | | |
|---|---|---|---|
| 3,730,935 A * | 5/1973 | Wittenwyler | B22C 1/226 523/141 |
| 4,761,313 A | 8/1988 | Jacobs | |
| 5,194,174 A | 3/1993 | Roe et al. | |
| 5,328,497 A | 7/1994 | Hazlett | |
| 5,595,782 A | 1/1997 | Cole | |
| 8,974,595 B2 | 3/2015 | Guyot et al. | |
| 2005/0019574 A1 | 1/2005 | McCrary | |
| 2007/0027233 A1* | 2/2007 | Yamaguchi | C08L 51/04 523/467 |
| 2010/0179077 A1 | 7/2010 | Turakhia et al. | |
| 2010/0311867 A1* | 12/2010 | Kim | C04B 26/14 523/171 |
| 2011/0160101 A1* | 6/2011 | Naderhoff | C09K 8/805 507/220 |
| 2012/0094023 A1 | 4/2012 | Yasui | |

FOREIGN PATENT DOCUMENTS

| | | | | |
|---|---|---|---|---|
| CN | 103664060 A | * | 3/2014 | ............. C04B 26/14 |
| EP | 2452978 A1 | * | 5/2012 | ............. B82Y 30/00 |
| WO | 2014174033 A2 | | 10/2014 | |

OTHER PUBLICATIONS

Machine translation of CN-103664060-A (no date).*
Machine translation of EP-2452978-A1 (no date).*
International Search Report and Written Opinion from PCT/US16/61562 dated Jan. 30, 2017 (14 pages).

* cited by examiner

*Primary Examiner* — Michael J Feely
(74) *Attorney, Agent, or Firm* — Calfee, Halter & Griswold LLP

(57) ABSTRACT

A low-dust composite building product is provided. The low-dust composite building product includes a binder system comprising one or more of a thermoset resin, a diluent, and a hardener; and a low-dust filler material comprising filler particles that have been pre-coated with a coating agent comprising one or more of the thermoset resin, the diluent, and the hardener from the binder system.

12 Claims, No Drawings

LOW-DUST FILLER FOR COMPOSITE BUILDING PRODUCT

CROSS-REFERENCE TO RELATED APPLICATIONS

This application claims priority to and the benefit of U.S. Provisional Patent Application No. 62/254,268, filed Nov. 12, 2015, the entire content of which is incorporated by reference herein.

BACKGROUND

Dust is an ongoing problem at construction sites. Composite building products—grout and mortar, for example—are often made from at least one powdered material that emits dust when it is handled. Dust suppressants are currently available, but they do not fully eliminate dust production and they add an additional ingredient to the process.

Composite building products are often made from three components: (1) a thermoset resin, (2) a hardener, and (3) a filler. The filler provides bulk and other performance characteristics to the product. In grout or mortar, for example, the filler is often sand. The thermoset resin and the hardener chemically react when mixed, creating a structural matrix in which the filler is dispersed. This is commonly called a reactive binder system. The end product—after the filler is mixed in—is often a grout or mortar, which is initially highly malleable and, upon curing, becomes extremely hard, rigid, and durable.

The filler material typically generates a significant amount of dust when it is handled and manufactured, which tends to cause problems as it spreads throughout the environment. For instance, the generated dust can harm machines, furniture, and people; cause local air quality violations; and require excessive cleanup. Further, any dust that escapes the mixing process is wasted material. Accordingly, reducing dust has been a longstanding goal in the construction industry.

The countermeasures currently available typically require adding an extra ingredient to the reactive binder system as a dust suppressant. For example, U.S. Pat. Nos. 8,974,595 B2 and 5,595,782 describe adding various oil-based substances, including vegetable and mineral oil, to a dry composition in an attempt to reduce dust emissions. In addition, U.S. Pat. No. 5,328,497 describes applying a lignosulfonate composition to fertilizer to prevent dust. Further, U.S. Pat. No. 5,194,174 describes methods for controlling dust by applying water-based solutions, including polyvinyl alcohol, to dust-producing materials.

Yet, these solutions are unsatisfactory for a number of reasons: First, introducing a new ingredient to a composite product complicates the process. The new ingredient might degrade the end-product's quality or interfere with the reactive binder process. For example, mineral oil can cause a plasticizing effect on the reactive binder system, reducing its overall strength. Thus, the user must determine whether the dust-suppressant is compatible with the other ingredients before using it.

Second, using an additional ingredient creates an added cost to produce the composite building product. Finally, the current dust suppressants do not effectively eliminate dust during manufacturing procedures.

SUMMARY

Various inventive concepts of the present invention are directed to a low-dust composite building product including a binder system comprising one or more of a thermoset resin, a diluent, and a hardener and a low-dust filler material comprising filler particles. The filler particles are pre-coated with a coating agent comprising one or more of the thermoset resin, the diluent, and the hardener from the binder system.

In some exemplary embodiments, the coating agent has a viscosity of about 100 to 5,000 cps.

In some exemplary embodiments, the filler particles include any one or more of inert mineral aggregates, sand, silica, calcium carbonate, clay, fuel ash, fly ash, ceramics, and barium sulfate.

In some exemplary embodiments, the thermoset resin is at least one of epoxy, polyurethane, polyurea, polyester, phenolic, vinyl ester, silicone, polyaspartic, and polyamide. In some exemplary embodiments, the thermoset resin comprises bisphenol A/epichlorohydrin epoxy resin.

In some exemplary embodiments, the diluent comprises a reactive diluent, such as, for example, neopentyl glycol diglycidyl ether, 1 phenyl glycidyl ether, n-butyl glycidyl ether, C12-C14 alkyl glycidyl ether, 2-ethylhexyl glycidyl ether, o-cresyl glycidyl ether, glycidyl ester of neodecanoic acid, trimethylolpropane triglycidyl ether, 1,4-butanediol diglycidyl ether, cyclohexane dimethanol diglycidyl ether, resorcinol diglycidyl ether, and diglycidyl ether of polypropylene glycol.

In some exemplary embodiments, the coating agent is a mixture of the thermoset resin and the diluent.

In some exemplary embodiments, the thermoset resin and low-dust filler material are present in the composite building product in a ratio from about 1:1 to about 1:8.

In some exemplary embodiments, the hardener and thermoset resin are present in the composite building product in a ratio from about 1:10 to about 10:1.

In some exemplary embodiments, the hardener comprises one or more of an amine, acid, acid anhydride, phenol, alcohol, and thiol hardener.

The low-dust composite building product of claim 1, wherein the low dust filler material comprises 0.50 wt. % to 1.00 wt. % of the coating agent.

Various inventive concepts of the present invention are directed to method of making a low-dust composite building product. The method includes forming a binder system comprising at least one of a thermoset resin, a diluent and a hardener, coating particles of a filler material with a coating agent to form a low-dust filler material, and adding the low-dust filler material to said binder system. The coating agent may include one more of the thermoset resin, diluent, and hardener from said binder system, In some exemplary embodiments, the thermoset resin is at least one of epoxy, polyurethane, polyurea, polyester, phenolic, vinyl ester, silicone, polyaspartic, and polyamide.

In some exemplary embodiments, the diluent is a reactive diluent, such as one or more of neopentyl glycol diglycidyl ether, 1 phenyl glycidyl ether, n-butyl glycidyl ether, C12-C14 alkyl glycidyl ether, 2-ethylhexyl glycidyl ether, o-cresyl glycidyl ether, glycidyl ester of neodecanoic acid, trimethylolpropane triglycidyl ether, 1,4-butanediol diglycidyl ether, cyclohexane dimethanol diglycidyl ether, resorcinol diglycidyl ether, and diglycidyl ether of polypropylene glycol.

In some exemplary embodiments, the coating agent is the mixture of the thermoset resin and the diluent.

In some exemplary embodiments, the thermoset resin and the low-dust filler material are present in the composite building product in a ratio from about 1:1 to about 1:8.

In some exemplary embodiments, the hardener comprises one or more of an amine, acid, acid anhydride, phenol, alcohol, and thiol hardener.

Various inventive concepts of the present invention are directed to a low-dust composite building product comprising a binder system comprising one or more of a thermoset epoxy resin, a monofunctional or polyfunctional glycidyl ether diluent, and a hardener; and a low-dust filler material comprising filler particles, wherein the coating agent comprises 25.0 wt. % to 100 wt % of the monofunctional or polyfunctional glycidyl ether diluent and 0 to 75 wt. % of the thermoset epoxy resin.

In some exemplary embodiments, the thermoset epoxy resin comprises bisphenol A/epichlorohydrin epoxy resin.

In some exemplary embodiments, the diluent is neopentyl glycol diglycidyl ether.

In some exemplary embodiments, the thermoset resin is at least one of epoxy, polyurethane, polyurea, polyester, phenolic, vinyl ester, silicone, polyaspartic, and polyamide and the diluent is a reactive diluent.

In some exemplary embodiments, the hardener comprises one or more of an amine, acid, acid anhydride, phenol, alcohol, and thiol hardener.

Various inventive concepts of the present invention are further directed to a method of making a low-dust composite building product. The method includes coating the particles of a filler material with a coating agent to form a low-dust filler material. The coating agent comprises one or more of a thermoset resin, a diluent, and a hardener. A binder system is then formed, comprising at least one of the thermoset resin, the diluent, and the hardener. The low-dust filler material is then added to the binder system.

DETAILED DESCRIPTION

While various exemplary methods and materials are described herein, other methods and materials similar or equivalent to those described herein are encompassed by the general inventive concepts. All references cited herein, including published or corresponding U.S. or foreign patent applications, issued U.S. or foreign patents, and any other references, are each incorporated herein by reference in their entireties, including all data, tables, figures, and text presented in the cited references.

Unless defined otherwise, all technical and scientific terms used herein have the same meaning as commonly understood by one of ordinary skill in the art to which the invention belongs.

The general inventive concepts are directed to a method for making a composite building product that includes a low-dust filler material that has been pre-treated with a coating agent so that it emits minimal dust, if any, when it is handled, and a composite building product that includes the low-dust filler as a component. The method, described more fully below, involves pre-treating the filler component of a composite building product by coating its particles with at least one of the composite product's other components before preparing the building product.

"Composite building product" denotes a building product that includes at least two components mixed together—one component being a filler material and the other component being a thermoset resin. Common composite building products include grout or mortar.

In general, a thermoset resin may be a naturally occurring or synthetic resin capable of curing. "Curing" denotes the process in which a thermoset resin hardens after being exposed to a catalyst, increased pressure, or increased temperature. The catalyst, increased pressure, or increased temperature causes the resin's molecules to cross-link, after which the resin displays new physical properties: increased hardness and melting point, for example.

In some exemplary embodiments of the present invention, the composite building product includes at least two components: (1) a thermoset resin and (2) a low-dust filler. The thermoset resin comprises a binder system that provides a matrix in which the low-dust filler may be dispersed. In some exemplary embodiments of the present invention, the composite building product includes at least three components: (1) a thermoset resin, (2) a hardener, and (3) a low-dust filler. In this embodiment, the thermoset resin and hardener together produce the binder system matrix in which the low-dust filler may be dispersed.

In some exemplary embodiments, the thermoset resin is a synthetic resin capable of curing by a chemical reaction, heat, pressure, or a combination thereof. In some further exemplary embodiments, the thermoset resin is curable by chemically reacting the resin with a hardener.

Examples of suitable thermoset resins include, but are not limited to, resins including epoxy, polyurethane, polyurea, polyester, phenolic, vinyl ester, silicone, polyaspartic, and polyamide. In some exemplary embodiments the resin is an epoxy resin, such as a bisphenol A/epichlorohydrin epoxy resin.

When making the composite building material, the ratio by weight of thermoset resin to filler material may be about 1:1 to about 1:8, or from about 1:2 to about 1:6.

In embodiments in which a hardener is included, the hardener to thermoset resin ratio by weight may be from about 1:10 to about 10:1. In further embodiments, the hardener to thermoset resin ratio by weight may be about 1:8 to about 3:1.

In some exemplary embodiments, the hardener may be a reactive chemical capable of curing the thermoset resin at room temperature. Examples of suitable reactive hardeners include, but are not limited to, amines—including blends of amido and aliphatic amines—acids, acid anhydrides, phenols, alcohols, and thiols.

In some exemplary embodiments, prior to mixing the thermoset resin and the filler, the thermoset resin may be mixed with a diluent, creating a resin-diluent mixture. The diluent may decrease the resin's viscosity, thus, improving its ability to be dispersed throughout and coat the filler material's particles. For example, in some exemplary embodiments the resin-diluent mixture's viscosity may be between about 0 and about 15,000 cps, or about 100 and about 5,000 cps, or about 200 and 1,000 cps.

Accordingly, in some exemplary embodiments, the diluent is capable of reducing the viscosity of the resin without causing significant changes in the physical properties of the resulting composite building product. For example, the resin-diluent mixture may be capable of curing at or about room temperature when combined with the hardener and filler.

Depending on the desired effect, the diluent may be included at any wt. % of the total resin-diluent, such as between 0 to 98 wt. % of the total resin-diluent. For example, in some exemplary embodiments the diluent comprises about 10 to about 50 wt. %, or from about 20 to about 40 wt. % of the total resin-diluent. In some exemplary embodiments, the diluent comprises about 25 wt. % of the total resin-diluent.

The diluent may be a reactive diluent, such as monofunctional glycidyl ether or polyfunctional glycidyl ether, or it may be a nonreactive diluent, such as water. Suitable reactive diluents may include, for example, neopentyl glycol diglycidyl ether, 1 phenyl glycidyl ether, n-butyl glycidyl ether, C12-C14 alkyl glycidyl ether, 2-ethylhexyl glycidyl ether, o-cresyl glycidyl ether, glycidyl ester of neodecanoic acid, trimethylolpropane triglycidyl ether, 1,4-butanediol diglycidyl ether, cyclohexane dimethanol diglycidyl ether, resorcinol diglycidyl ether, and diglycidyl ether of polypropylene glycol.

The low-dust filler may comprise one or more inorganic materials that have been pre-treated with a coating agent. Exemplary filler materials may include, for example, inert mineral aggregates in varying particle sizes, sand, silica, ceramics, calcium carbonate, clay, fuel ash, fly ash, barium sulfate, and the like.

By "low-dust" it is meant that the filler material emits a very low amount of dust, if any, during the formation of the composite building product. In some exemplary embodiments, the low-dust filler is dust free.

In some exemplary embodiments, the coating agent may include the resin, the diluent, the resin-diluent mixture, or the hardener. In some further exemplary embodiments, the coating agent comprises a component of the composite building product. In some further exemplary embodiments, the coating agent's viscosity is between about 0 and about 15,000 cps, or about 100 and about 5,000 cps, or about 200 and 1,000 cps. In some further exemplary embodiments the coating agent may sustain its capacity to suppress dust after being applied to a filler material for more than about 5 weeks, or more than about 15 weeks, or more than about 34 weeks.

In the exemplary method for preparing the low-dust filler and composite building product formed therefrom that follows, it is to be understood that the order of the method steps provided is exemplary and not intending to be limiting in any way.

The method for preparing the low-dust filler may include mixing the filler material for a pre-determined period of time to obtain a uniform filler mixture. After the material has been mixed for a determined period of time, the coating agent may be added to the mixture and mixed for a pre-determined period of time. In some exemplary embodiments, the coating agent may comprise about 0.50 to about 1.00 wt. % of the total low-dust filler. In some further exemplary embodiments, the coating agent may comprise about 0.85 to about 0.97 wt. %, or from about 0.90 to about 0.94 wt. % of the total low-dust filler. The coating agent and filler material may be mixed for 7-10 minutes, or until the coating agent is evenly dispersed throughout the filler material.

In some exemplary embodiments an additional, highly porous material may be included as a filler material. The highly porous material may be added to the mixture after the coating agent has been applied and mixed to the initial filler material. Exemplary highly porous materials include granular activated carbon, zeolites, pillared materials, clathrasils, and clathrates.

Once formed, the low-dust filler may then be mixed with the resin-diluent mixture and the hardener to create an embodiment of the cured composite building product. The curing process may be started before the low-dust filler is introduced by mixing the resin-diluent with the hardener. For example, in some exemplary embodiments, the resin-diluent mixture and the hardener may be poured into a mixing vessel and mixed for 2-3 minutes. Then, the low-dust filler may be introduced to the mixture of resin-diluent and hardener. The low-dust filler may be added in multiple successions and amounts to control the volume of the composite building product. The ratio of resin-diluent mixture and hardener to low-dust filler may be from about 1:1 to about 1:10, or from about 1:3 to about 1:6, or about 1:5.

Accordingly, the coating agent—which may be the thermoset resin, the hardener, the diluent, or the resin-diluent mixture—will serve at least two functions: (1) it will pre-coat the filler particles to create a low-dust filler in the composite building product; and (2) it will form part of the reactive binder system that creates the structural matrix for the composite building product.

The low-dust filler and composite building product formed according to the present inventive concepts are more efficient and less expensive than existing dust solutions for at least three reasons, but not limited to these three reasons: (1) the dust suppressant is more effective at suppressing dust than any current options; (2) the dust suppressant uses a component already required in the reactive binder system, thus, no additional chemicals or materials must be purchased; and (3) since the dust suppressant is already a part of the reactive binder system, there is no concern that it will be incompatible with the system.

In order to more thoroughly describe this invention, the following working examples are provided.

Example 1

To prepare a batch of low-dust filler, the filler materials were first added to a mixing apparatus. Specifically, the following materials were added: 1,797 lbs of various types of sand; 16.8 lbs of silica sand; 327 lbs of barium sulfate; and 131 lbs of hollow ceramic spheres. These components were mixed for seven minutes.

While waiting for the filler materials to mix for seven minutes, the resin-diluent mixture was prepared by mixing the thermoset resin and the diluent. Specifically, 11.45 lbs of EPON™ 828 (a thermoset resin) and 3.891 lbs of Heloxy™ 68 (neopentyl glycol diglycidyl ether) were mixed in a 5-gallon plastic pail.

After the filler materials had mixed for 7 minutes, and while the mixer was still mixing, the resin-diluent mixture was slowly poured into the mixer. The resin-diluent mixture was poured from one side of the mixer to the other, so as to evenly distribute it throughout the filler materials.

After the resin-diluent mixture was poured into the mixer, it was mixed for an additional ten minutes.

After the resin-diluent mixture and filler materials were mixed for the additional ten minutes, 8.2 lbs of granular activated carbon was added to the mixer and mixed for three minutes.

Example 2

Based on the general method and ingredients described in Example 1, seven low-dust filler samples were created with resin-diluent mixtures that varied in their resin to diluent ratios or quantities of resin-diluent mixture. The samples were mixed according to the following ratios and quantities:
- Sample 1: 100% Heloxy™ 68 and 0% Epon™ 828 (0.70 wt. %);
- Sample 2: 100% Heloxy™ 68 and 0% Epon™ 828 (0.94 wt. %);
- Sample 3: 75% Heloxy™ 68 and 25% Epon™ 828 (0.70 wt. %);
- Sample 4: 50% Heloxy™ 68 and 50% Epon™ 828 (0.94 wt. %);
- Sample 5: 25% Heloxy™ 68 and 75% Epon™ 828 (0.70 wt. %);
- Sample 6: 25% Heloxy™ 68 and 75% Epon™ 828 (0.94 wt. %);
- Sample 7: 0% Heloxy™ 68 and 100% Epon™ 828 (not tested).

Each resin-diluent mixture, besides Sample 7, was poured evenly into a mixing vessel containing 32 lbs. of aggregate—a mixture similar to the filler material described in Example 1—and mixed for seven minutes, creating six low-dust filler samples varying based on the resin to diluent ratio, quantity of resin-diluent, or both. Each sample was placed into a plastic 5-gallon pail with a resealable lid.

Each week, for 34 weeks, the six samples were tested for their Dust Suppressant Effectiveness (DSE). DSE testing consisted of scooping a portion of the sample into a 300 ml fiber cup so that the cup was full. The full 300 ml cup was raised 16 inches and the contents were dropped back into the pail. A quantitative number was assigned to the amount of visual dust plume that was released using a 0 to 5 scale: 0=no dust; 5=extreme dust. It was determined that the aggregate with no coating agent had a 5 DSE value. Details of the DSE values for each sample are provided below in Table 1.

TABLE 1

Dust Suppressant Effectiveness for Low-dust Filler Samples

| Visc. (cps) Week | AGG. n/a DSE | SAMPLE 1 25 DSE | SAMPLE 2 25 DSE | SAMPLE 3 58 DSE | SAMPLE 4 280 DSE | SAMPLE 5 900 DSE | SAMPLE 6 900 DSE | SAMPLE 7 11000-15000 DSE |
|---|---|---|---|---|---|---|---|---|
| 1 | 5 | 0 | 0 | 0 | 0 | 0 | 0 | n/a |
| 2 | 5 | 0 | 0 | 0 | 0 | 0 | 0 | n/a |
| 3 | 5 | 0 | 0 | 0 | 0 | 0 | 0 | n/a |
| 4 | 5 | 0 | 0 | 0 | 0 | 0 | 0 | n/a |
| 5 | 5 | 0 | 0 | 0 | 0 | 0 | 0 | n/a |
| 6 | 5 | 0 | 0 | 0 | 0 | 0 | 0 | n/a |
| 7 | 5 | 1 | 1 | 0 | 0 | 0 | 0 | n/a |
| 8 | 5 | 2 | 2 | 1 | 0 | 0 | 0 | n/a |
| 9 | 5 | 3 | 3 | 1 | 1 | 0 | 0 | n/a |
| 10 | 5 | 4 | 4 | 2 | 1 | 0 | 0 | n/a |
| 11 | 5 | 5 | 5 | 2 | 2 | 0 | 0 | n/a |
| 12 | 5 | 5 | 5 | 3 | 2 | 0 | 0 | n/a |
| 13 | 5 | 5 | 5 | 3 | 3 | 0 | 0 | n/a |
| 14 | 5 | 5 | 5 | 3 | 3 | 0 | 0 | n/a |
| 15 | 5 | 5 | 5 | 4 | 3 | 0 | 0 | n/a |
| 16 | 5 | 5 | 5 | 4 | 4 | 0 | 0 | n/a |
| 17 | 5 | 5 | 5 | 4 | 4 | 0 | 0 | n/a |
| 18 | 5 | 5 | 5 | 4 | 4 | 0 | 0 | n/a |
| 19 | 5 | 5 | 5 | 4 | 4 | 0 | 0 | n/a |
| 20 | 5 | 5 | 5 | 5 | 5 | 0 | 0 | n/a |
| 21 | 5 | 5 | 5 | 5 | 5 | 0 | 0 | n/a |
| 22 | 5 | 5 | 5 | 5 | 5 | 0 | 0 | n/a |
| 23 | 5 | 5 | 5 | 5 | 5 | 0 | 0 | n/a |
| 24 | 5 | 5 | 5 | 5 | 5 | 0 | 0 | n/a |
| 25 | 5 | 5 | 5 | 5 | 5 | 0 | 0 | n/a |
| 26 | 5 | 5 | 5 | 5 | 5 | 0 | 0 | n/a |
| 27 | 5 | 5 | 5 | 5 | 5 | 0 | 0 | n/a |
| 28 | 5 | 5 | 5 | 5 | 5 | 0 | 0 | n/a |
| 29 | 5 | 5 | 5 | 5 | 5 | 0 | 0 | n/a |
| 30 | 5 | 5 | 5 | 5 | 5 | 1 | 0 | n/a |
| 31 | 5 | 5 | 5 | 5 | 5 | 1 | 0 | n/a |
| 32 | 5 | 5 | 5 | 5 | 5 | 1 | 0 | n/a |
| 33 | 5 | 5 | 5 | 5 | 5 | 1 | 0 | n/a |
| 34 | 5 | 5 | 5 | 5 | 5 | 1 | 0 | n/a |

As shown in Table 1, treating the aggregate filler with resin-diluent mixes ranging from 100% diluent and 0% resin to 25% diluent and 75% resin significantly suppressed dust production. Indeed, through the first six weeks of storage, each resin-diluent variant produced a 0 DSE value, which represents that no dust was visually observed during the dust suppression testing.

Further, when the resin-diluent mixture contained 25% diluent and 75% resin and was 0.94 wt. % of aggregate weight, the sample produced a 0 DSE value throughout the duration of the 34 weeks of testing.

Although only a few embodiments of the present invention have been described above, it should be appreciated that many modifications can be made without departing from the spirit and scope of the invention. All such modifications are intended to be included within the scope of the present invention, which is to be limited only by the following claims:

We claim:

1. A method of making a low-dust composite building product, comprising:
   forming a binder system comprising a thermoset resin, a reactive diluent and a hardener;
   coating particles of a filler material with a coating agent to form a low-dust filler material, wherein the coating agent comprises the thermoset resin, the reactive diluent, and optionally the hardener from said binder system,
   adding said low-dust filler material to said binder system;
   wherein the thermoset resin and said low-dust filler material are present in the composite building product in a ratio from about 1:1 to about 1:6.

2. The method of claim 1, wherein the coating agent has a viscosity of about 100 to about 5,000 cps.

3. The method of claim 1, wherein the thermoset resin is at least one of epoxy, polyurethane, polyurea, polyester, phenolic, vinyl ester, silicone, polyaspartic, and polyamide.

4. The method of claim 1, wherein the reactive diluent comprises one or more of neopentyl glycol diglycidyl ether, 1 phenyl glycidyl ether, n-butyl glycidyl ether, C12-C14 alkyl glycidyl ether, 2-ethylhexyl glycidyl ether, o-cresyl glycidyl ether, glycidyl ester of neodecanoic acid, trimethylolpropane triglycidyl ether, 1,4-butanediol diglycidyl ether, cyclohexane dimethanol diglycidyl ether, resorcinol diglycidyl ether, and diglycidyl ether of polypropylene glycol.

5. The method of claim 1, wherein the coating agent is the mixture of the thermoset resin and the diluent.

6. The method of claim 1, wherein the hardener comprises one or more of an amine, acid, acid anhydride, phenol, alcohol, and thiol hardener.

7. The method of claim 1, wherein the coating agent consists of the thermoset resin and the diluent.

8. The method of claim 1, wherein said filler particles include any one or more of inert mineral aggregates, sand, silica, calcium carbonate, clay, fuel ash, fly ash, ceramics, and barium sulfate.

9. The method of claim 1, wherein the thermoset resin comprises bisphenol A/epichlorohydrin epoxy resin.

10. The method of claim 1, wherein the diluent is neopentyl glycol diglycidyl ether.

11. The method of claim 1, wherein the hardener and thermoset resin are present in the composite building product in a ratio from about 1:10 to about 10:1.

12. The method of claim 1, wherein the low dust filler material comprises 0.50 wt. % to 1.00 wt. % of the coating agent.

\* \* \* \* \*